(12) United States Patent
de Swardt (10) Patent No.: US 11,804,748 B2
(45) Date of Patent: Oct. 31, 2023

(54) CORONA PROTECTION INSULATION SYSTEM

(71) Applicant: The Timken Company, North Canton, OH (US)

(72) Inventor: Jan de Swardt, Eustis, FL (US)

(73) Assignee: The Timken Company, North Canton, OH (US)

( * ) Notice: Subject to any disclaimer, the term of this patent is extended or adjusted under 35 U.S.C. 154(b) by 0 days.

(21) Appl. No.: 17/748,407

(22) Filed: May 19, 2022

(65) Prior Publication Data

US 2022/0393539 A1 Dec. 8, 2022

Related U.S. Application Data

(60) Provisional application No. 63/196,573, filed on Jun. 3, 2021.

(51) Int. Cl.
*H02K 3/40* (2006.01)
*H02K 15/10* (2006.01)

(52) U.S. Cl.
CPC ............. *H02K 3/40* (2013.01); *H02K 15/105* (2013.01)

(58) Field of Classification Search
CPC .. H02K 3/00; H02K 3/04; H02K 3/30; H02K 3/32; H02K 3/34; H02K 3/345; H02K 3/40; H02K 15/00; H02K 15/04; H02K 15/045; H02K 15/10; H02K 15/12; H02K 15/105; H01B 3/00; H01B 3/04; H01B 19/00; H01B 19/12

See application file for complete search history.

(56) References Cited

U.S. PATENT DOCUMENTS

| | | | |
|---|---|---|---|
| 3,891,880 | A | 6/1975 | Britsch |
| 4,427,740 | A | 1/1984 | Stackhouse et al. |
| 5,175,396 | A | 12/1992 | Emery et al. |
| 5,319,276 | A | 6/1994 | Schuler |
| 6,420,812 | B1 | 7/2002 | Emery |
| 6,498,415 | B1 | 12/2002 | Emery |
| 6,836,204 | B2 | 12/2004 | Reid et al. |
| 7,252,118 | B2 | 8/2007 | Reid |
| 9,059,616 | B1 | 6/2015 | Rao |
| 10,333,374 | B2 | 6/2019 | Sullivan et al. |
| 10,992,199 | B2 | 4/2021 | Nikrant et al. |
| 2013/0221790 | A1 | 8/2013 | Reid et al. |
| 2014/0300241 | A1 | 10/2014 | Reid et al. |

*Primary Examiner* — Tran N Nguyen
(74) *Attorney, Agent, or Firm* — Michael Best & Friedrich LLP (57) ABSTRACT

An insulation system for an electric machine coil includes the following layers situated in sequence over an insulated conductor: a first corona shield tape, a stress grading tape, a second corona shield tape having a first overlap length with the stress grading tape and a second greater overlap length with the first corona shield tape, an insulation tape, and a sealing tape.

21 Claims, 8 Drawing Sheets

CORONA PROTECTION INSULATION SYSTEM

CROSS-REFERENCE TO RELATED APPLICATIONS

This application claims priority to U.S. Provisional Patent Application No. 63/196,573 filed on Jun. 3, 2021, the entire contents of which are incorporated by reference herein.

BACKGROUND

The present application relates to production of insulation systems for insulating the windings of electric machines subjected to high field strengths. Although widely known and effective, high voltage insulation systems produced through this technique are only designed for use with voltages up to 22 kV.

SUMMARY

In one aspect, the invention provides advanced corona protection for medium and high voltage winding insulation up to and including 25 kV.

In another aspect, the invention provides an insulation system for an electric machine coil, the insulation system comprising the following layers situated in sequence over an insulated conductor: a first corona shield tape, a stress grading tape, a second corona shield tape having a first overlap length with the stress grading tape and a second greater overlap length with the first corona shield tape, an insulation tape, and a sealing tape.

In yet another aspect, the invention provides a manufacturing method for producing the same.

In yet another aspect, the invention provides a method of starting a rotating electric machine. The method includes providing a 25 kV supply high voltage line, and connecting the rotating electric machine directly to the 25 kV supply high voltage line, without a step down transformer from 25 kV to a lower voltage.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Insulation systems used in medium and high voltage windings (typically the stator) are subjected to partial discharge. The system used to reduce degradation of the insulation is called the corona protection. Traditional corona protection is only designed for voltages up to 22 kV, due to higher field strengths at higher voltages heating and destroying the corona protection system. The present disclosure provides an advanced corona protection insulation method that is able to reduce degradation of the insulation at voltages even up to 25 kV.

Figure 1:
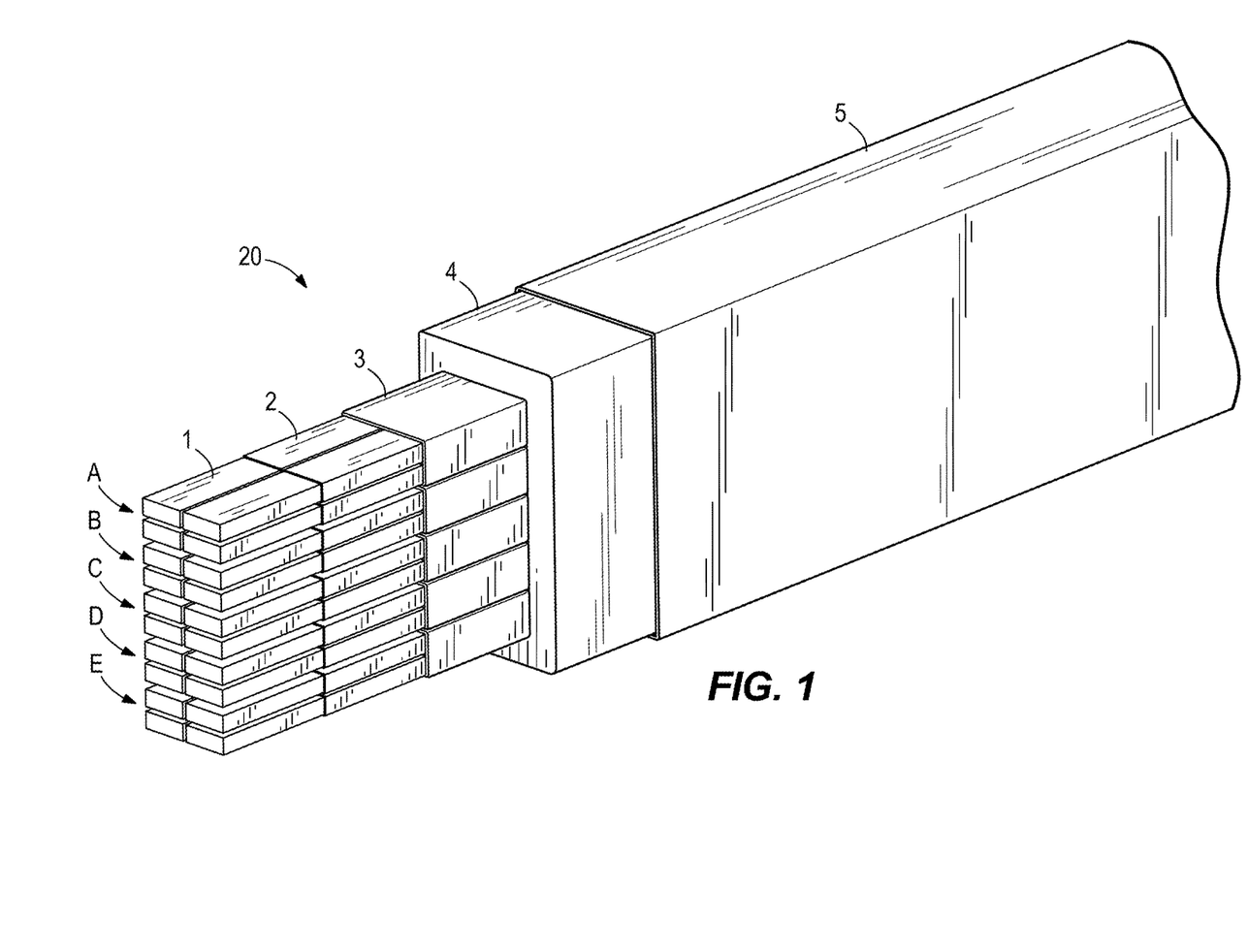
FIG. 1 is a perspective view of a straight core section of a coil for an electric machine winding, the coil having sequential cutaways showing the layers thereof.
Figure 2:
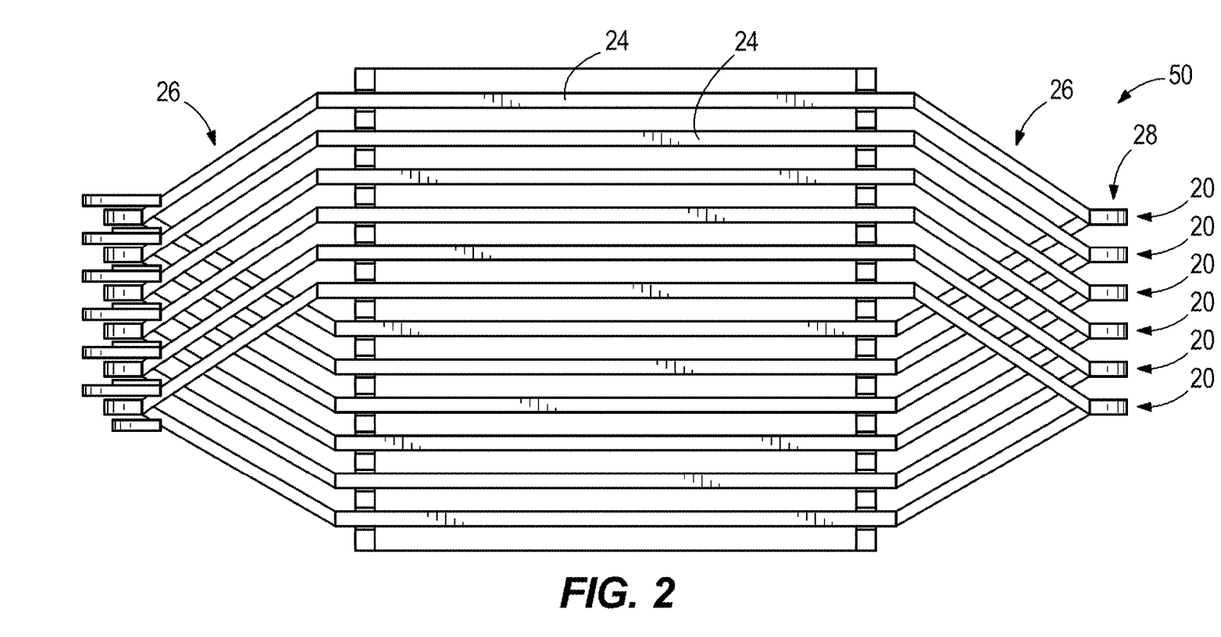
FIG. 2 is a top view of an exemplary stator core.
Figure 3:
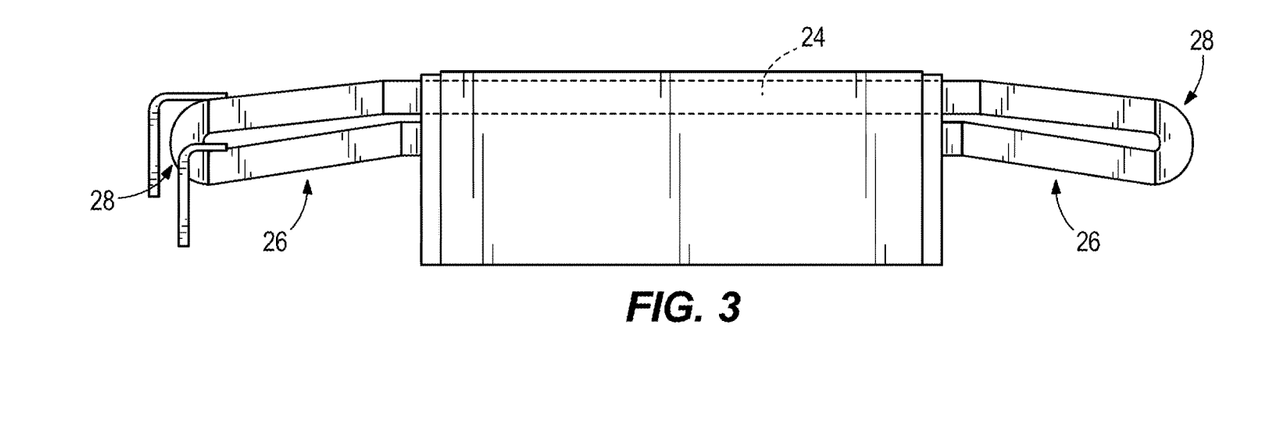
FIG. 3 is a front view of the stator core of FIG. 2.

Before the method is described, it is noted that FIG. 1 illustrates an exemplary layout for a coil 20. The coil 20 can be used in the construction of a stator 50, an example of which is shown in FIGS. 2 and 3. Numerous coils 20 make up the winding of the stator 50, and each coil 20 defines a core section 24 and opposite overhang sections 26 outside the core. At the distal end of each overhang section 26 is a nose or knuckle 28 where the coil 20 changes direction, forming a 180-degree turnaround. The coil 20 is shown having a basic construction known in the art, onto which further advancements are made according to the present invention. At the center of the coil 20 is a conductor 1. The conductor 1 is made from a conductive material, such as copper or aluminum for example. The conductor 1 is annealed to ensure ductility and excellent formability during the coil manufacturing process. The conductor 1 has smooth radiused edges to reduce high field concentrations. Covering the conductor 1 is an insulating layer or conductor insulation 2. The conductor insulation 2 may include multiple coats of a type of resin of modified polyester layers and/or polyamide-imide layers and/or polyimide layers and/or layers of glass yarn and resin and/or multiple layers of mica paper reinforced with glass cloth, polyester film, or polyester mat. Depending on the machine design, the conductors 1 with the conductor insulation 2, which form insulated conductors, are arranged together in multiple parallel sets. Each parallel set together forms a turn A, B, C, D, E. FIG. 1 has two conductors 1 in the width and two conductors 1 in the height to together form four conductors 1 in parallel per turn. FIG. 1 illustrates one coil 20 wound with 5 turns A-E, or 5 turns per coil.

Depending on the machine design, a dedicated turn insulation 3 may be applied. For example, each turn A-E is covered with one or more layers of mica paper reinforced with glass cloth, polyester film, or polyester mat that constitute the turn insulation 3. The turn insulation 3 extends around the collection of insulated conductors 1 in the turn, rather than around the individual insulator conductors 1. Main wall insulation 4 is provided outside the turn insulation 3, if present. The main wall insulation 4 can be constructed in a variety of ways. In some constructions, the main wall insulation 4 includes several layers of tape, that may include one or more layers of mica paper reinforced with glass cloth, polyester film or polyester mat and polyimide film, one or more layers of mica paper reinforced with glass cloth, polyester film and one or more layer of glass, polyester or aramid backed mica tape. Furthermore, a corona shield tape 5 can be provided outside the main wall insulation 4 (e.g., the corona shield tape 5 can be provided for voltage ratings above 5 kV, and otherwise omitted for voltage ratings up to 5 kV). The corona shield tape 5 is a low resistivity tape (e.g., 300 to 1000 Ohm/cm) including glass fabric, impregnated with an electrically conductive varnish and optional nano particles to improve electrical and thermal properties as well as erosion resistance. FIG. 1 illustrates the coil 20 in its straight core section 24. However, the overhang sections 26 can have additional layers outside the corona shield tape 5. For example, stress grading tape may be provided outside the corona shield tape 5, only on the overhang section 26. Sealing tape can be provided outside the stress grading tape.

Figure 4:
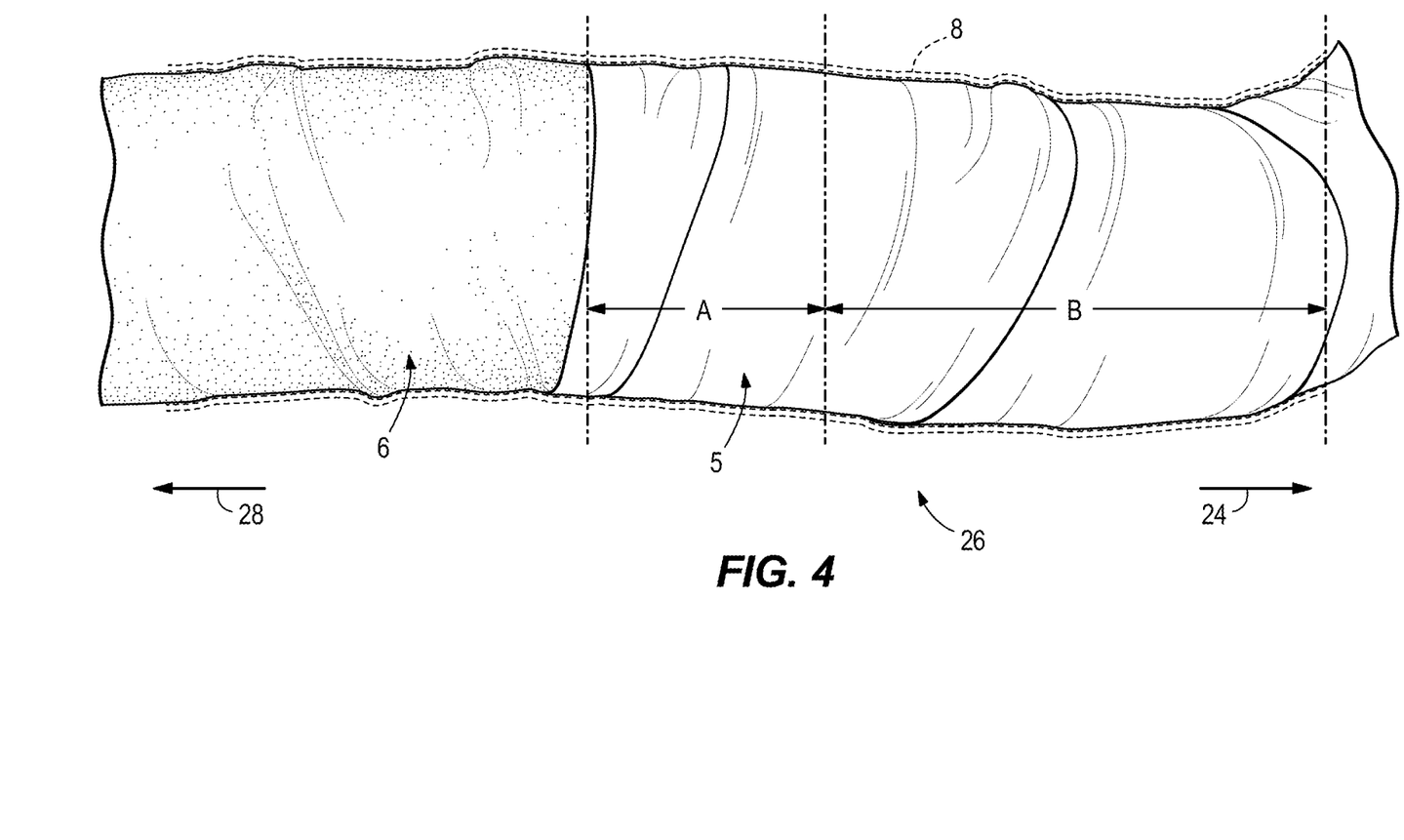
FIG. 4 is a perspective view illustrating a partially wrapped winding coil according to the present disclosure.
Figure 5:
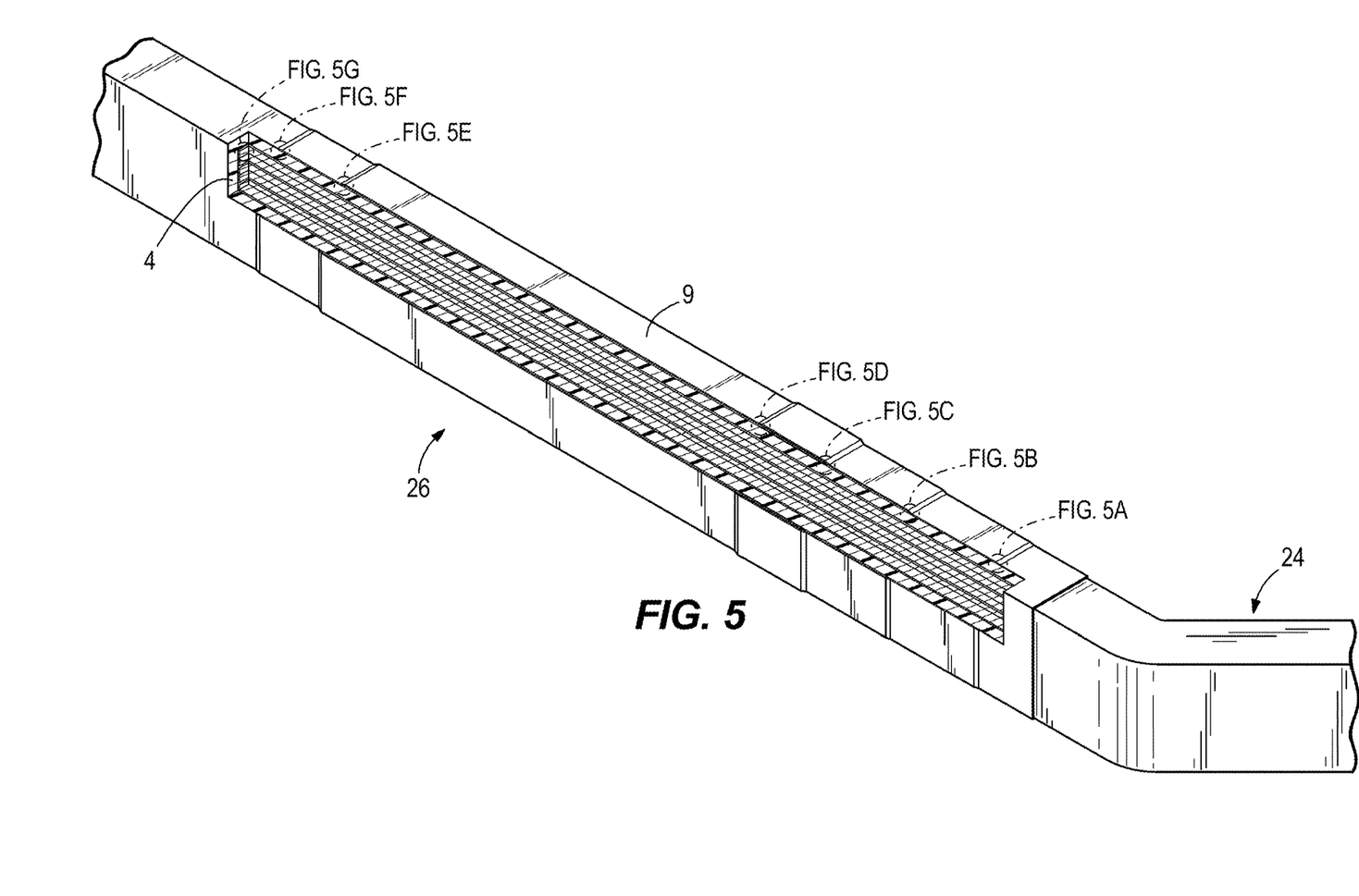
FIG. 5 is a perspective view of an overhang section of the coil, including a cutaway section.

FIGS. 4 and 5 illustrate additional details of the insulation system of the coil 20 within its overhang section 26. FIG. 4 illustrates the insulation system prior to the application of the insulation tape 8 and the sealing tape 9 shown on the completed insulation of FIG. 5. The insulation tape 8 can include several layers of tape, that may include one or more layers of mica paper reinforced with glass cloth, polyester film or polyester mat and polyimide film, one or more layers of mica paper reinforced with glass cloth, polyester film and one or more layer of glass, polyester or aramid backed mica tape. FIG. 4 shows an exposed portion of the stress grading tape 6, which is a voltage variable resistivity tape including woven polyester fabric tape with selvage and impregnated with an electrically semi conductive varnish. The sealing tape 9, the outermost layer shown in FIG. 5, forms an outer layer that is smooth (reducing build-up of surface contaminants) and includes a waterproof surface finish. The sealing tape 9 can be polyester fabric tape impregnated with a thermosetting epoxy resin. FIGS. 4-5F also illustrate a unique corona protection system, which includes the aforementioned corona shield tape 5, which is a first, or innermost, corona shielding layer of the insulation system. A second corona shield tape 7 is wrapped over the stress grading tape 6 and onto the first corona shield tape 5, e.g., extending at least 2 inches onto the first corona shield tape 5.

Figure 5A:
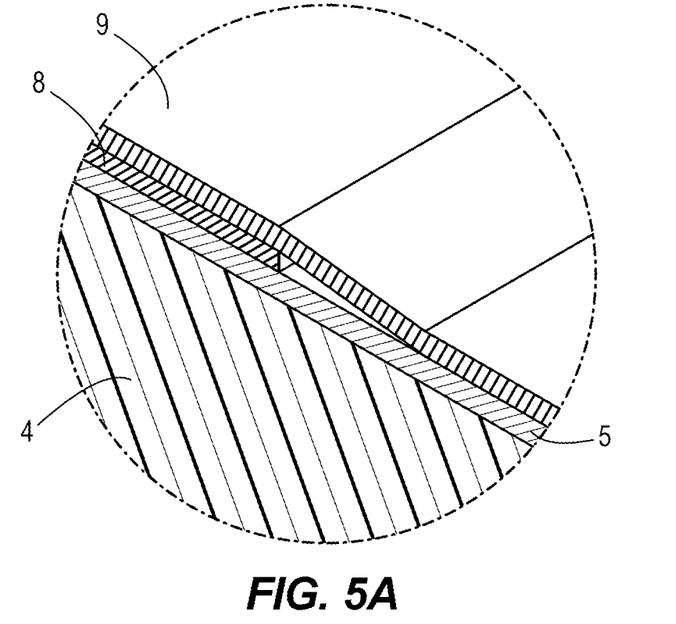
FIG. 5A is a detail view of the insulation system at a first distance from a core section of the coil.
Figure 5B:
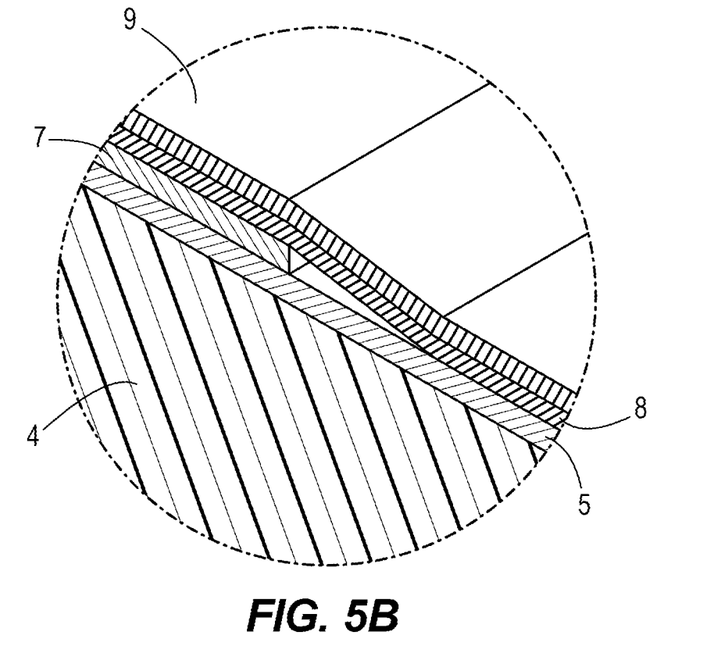
FIG. 5B is a detail view of the insulation system at a second distance from the core section of the coil.
Figure 5C:
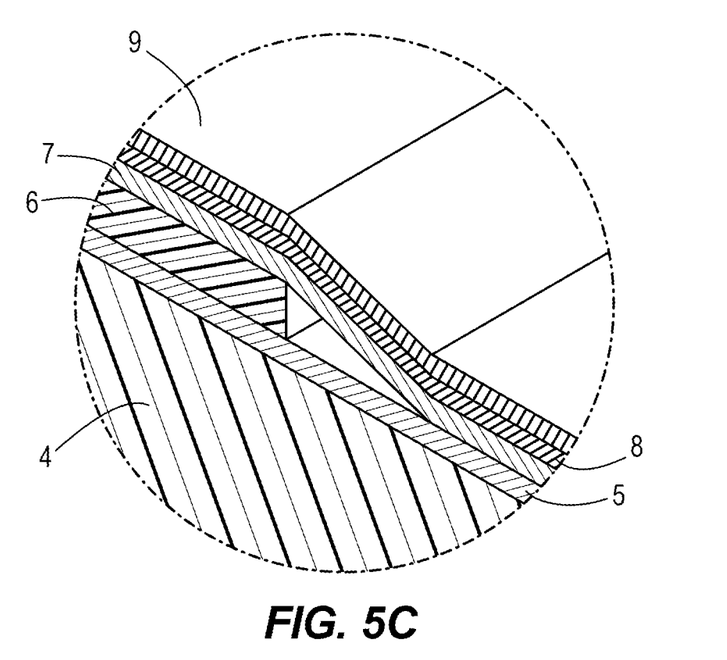
FIG. 5C is a detail view of the insulation system at a third distance from the core section of the coil.

FIGS. 5A-5F illustrate the details of the insulation system at various distances from a core section of the coil. The first corona shield tape 5 begins in the core section 24 of the coil and extends into the overhang section 26 of the coil over a distance. The first corona shield tape 5 is half-lap wrapped and may comprise, for example, polyester fleece or glass fabric impregnated with electrically conductive varnish, such as carbon black. The sealing tape 9 is provided as the outermost layer of the insulation system, beginning within the overhang section 26. As shown in FIG. 5A, an outer insulation 8 may be provided as the second outermost layer of the insulation system, beginning within the overhang section 26 at a distance further from the core section 24 than where the sealing tape 9 begins. Both the sealing tape 9 and the outer insulation 8 overlap a portion of the first corona shield tape 5. As illustrated in FIG. 5B, the insulation system includes a second corona shield tape 7 that begins within the overhang section 26 at a distance further from the core section 24 than the beginning of the outer insulation 8. The second corona shield tape 7 is provided between the first corona shield tape 5 and the outer insulation 8, and the second corona shield tape 7 directly contacts the first corona shield tape 5 over a distance B (FIG. 4). After the distance B, closer to the knuckle 28 of the coil 20, a stress grading tape 6 is provided between the first corona shield tape 5 and the second corona shield tape 7 (FIG. 5C). Both the stress grading tape 6 and the second corona shield tape 7 are half-lap wrapped.

Figure 5D:
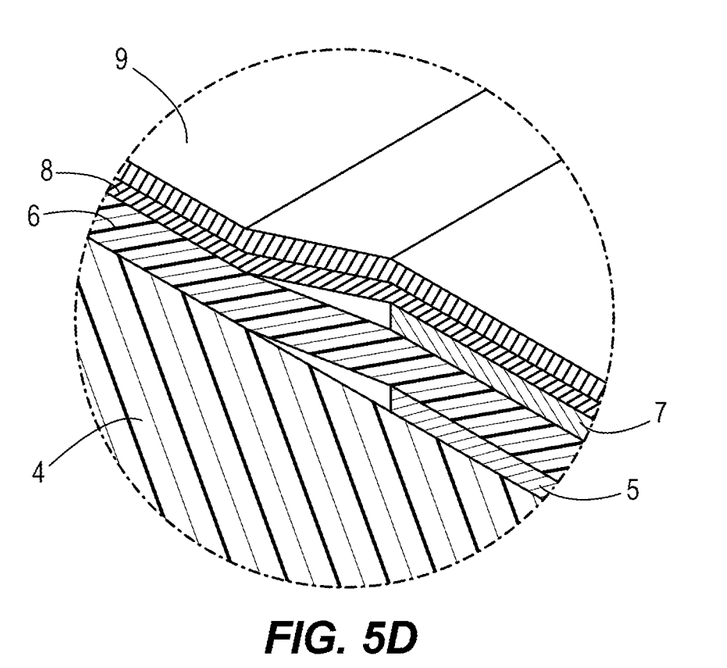
FIG. 5D is a detail view of the insulation system at a fourth distance from the core section of the coil.
Figure 5E:
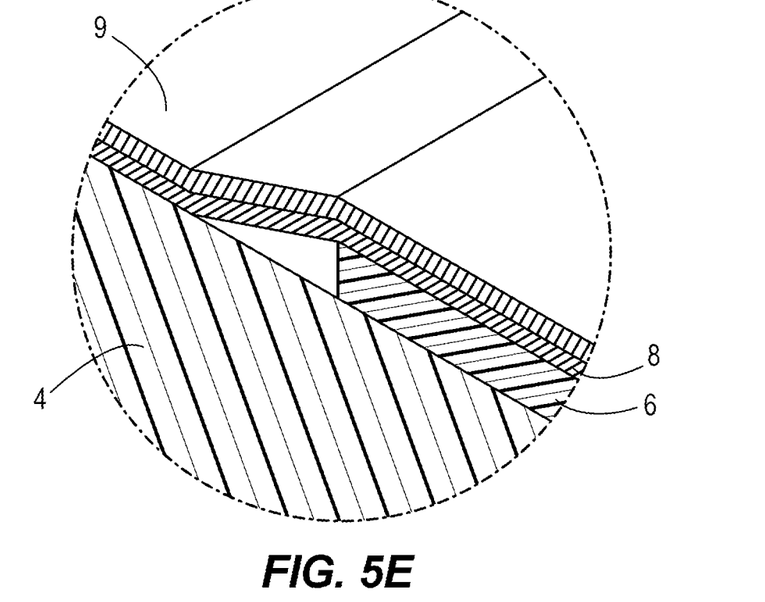
FIG. 5E is a detail view of the insulation system at a fifth distance from the core section of the coil.
Figure 5F:
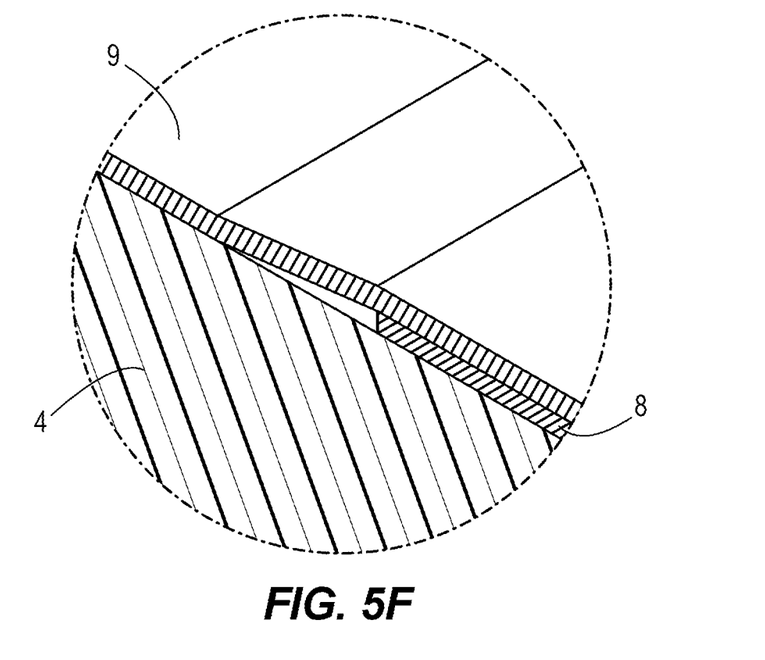
FIG. 5F is a detail view of the insulation system at a sixth distance from the core section of the coil.
Figure 5G:
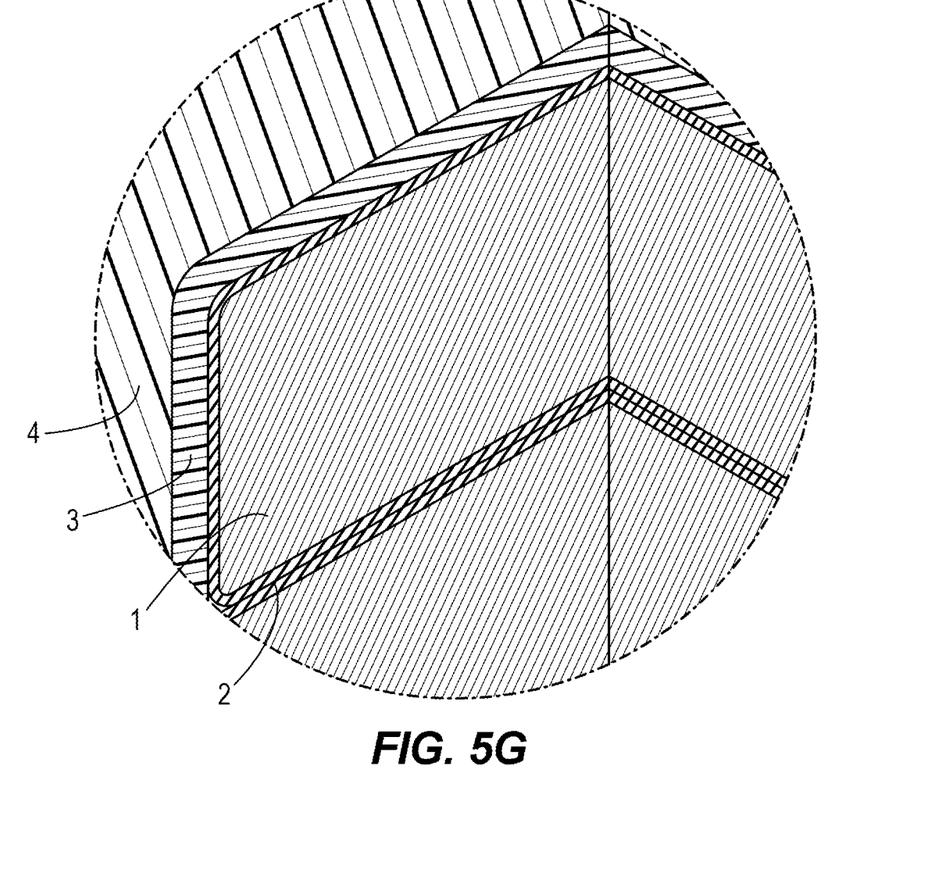
FIG. 5G is a detail view of the insulation system beneath a main insulation layer.

The second corona shield tape 7 extends directly over the stress grading tape 6 over a distance A and then terminates (FIG. 5D). Accordingly, the second corona shield tape 7 has a first overlap length with the stress grading tape 6 and a second greater overlap length with the first corona shield tape 5. The first corona shield tape 5 may terminate at the same point as the second stress grading tape 7, or it may terminate at a different distance from core section 24. The stress grading tape 6 extends further toward the knuckle 28 than both the first corona shield tape 5 and the second corona shield tape 7. The stress grading tape 6 terminates at a distance from the knuckle 28 (FIG. 5E), and the outer insulation 8 terminates at another distance from the knuckle 28 (FIG. 5F), wherein the outer insulation 8 extends further toward the knuckle 28 than the stress grading tape 6. After the outer insulation 8 terminates, only the sealing tape 9 is provided around the main insulation 4 within the overhang section 26.

The method can be described as follows. First, a coil 20 is provided with, for example, conductors 1, conductor insulation 2, optional turn insulation 3, and main wall insulation 4. On top of the final layer of main wall insulation 4, apply the first corona shield tape 5 (e.g., polyester fleece or glass fabric impregnated with electrically conductive varnish, such as carbon black) in one half-lap layer in the core section 24 of the coil 20 and extending at least 3 inches past the end of the core. Secondly, with an overlap of between ½ inch and ¾ inch with the first corona shield tape 5, apply stress grading tape 6 (e.g., polyester fleece or glass fabric impregnated with electrically semi-conductive varnish, such as silicon carbide) in one half-lap layer further onto the overhang section 26 towards the coil knuckle 28 (at least 6½ inches for a 25 kV rating). For example, the stress grading tape 6 may be applied 6¾ inches for a 25 kV rating. However, in some aspects, the present disclosure may be used for other voltage ratings, below 25 kV. The length may increase with an increase in the voltage rating, for example, as noted in the table below.

| Voltage Rating | Stress Grading Length |
|---|---|
| Up to 4 kV | Optional. If used, at least 2 in., not more than 4 in. used |
| Up to 5 kV | Optional. If used, at least 2.5 in., not more than 4 in. |
| Up to 7 kV | At least 2.75 in., not more than 4 in. |
| Up to 8 kV | At least 3 in., not more than 6 in. |
| Up to 10 kV | At least 4 in., not more than 9 in. |
| Up to 14 kV | At least 4.5 in., not more than 12 in. |
| Up to 15 kV | At least 5 in., not more than 16 in. |
| Up to 25 kV | At least 6.5 in., not more than 20 in. |

To ensure maximum electrically conductive contact between the first corona shield tape 5 and the stress grading tape 6, the second corona shield tape 7 is applied. The second corona shield tape 7 starts near the start of the stress grading tape 6, overlapping the stress grading tape 6 by ½ inch to ¾ inch. In FIG. 4, the length A is the length in which the second corona shield tape 7 is situated directly over the stress grading tape 6. The second corona shield tape 7 extends another single half-lap tape layer over the stress grading tape 6 and onto the first corona shield tape 5, e.g., extending at least 2 inches onto the first corona shield tape 5. In FIG. 4, the length B is the length in which the second corona shield tape 7 is situated directly over the first corona shield tape 5. However, the second corona shield tape 7 does not extend into the core section 24. Lastly, start at the beginning of the second corona shield tape 7 (outside of the core section 24) and apply a half-lap layer of insulation tape 8 over the second corona shield tape 7 and towards the coil knuckle 28. The insulation tape 8 covers at least the stress grading tape 6 but may also extend to the coil knuckle 28. The same sequence of layers can be applied in the same way on both a first side of the overhang section 26 leading towards the knuckle 28 and separately on the second side of the overhang section 26 leading towards the knuckle 28. The sealing tape 9 is then applied from the end of the core all around one side of the overhang section 26, around the knuckle 28, and then along the other side of the overhang section 26 back to the core such that all of the coil 20 that is outside the core is covered and sealed by the sealing tape 9. The sealing tape 9 completes the insulation system.

This process can be used effectively, resulting in a vacuum and pressure impregnated insulation system configured for use at very high voltages. The coil 20 may be assembled with a core into a winding. The coil 20 produced by the above process can be rated for and used within an electric machine operating with a field voltage above 22 kV, for example, up to 25 kV. Voltage ratings need to be proven to be in accordance with international standards by passing tests stipulated in international standard such as, but not limited to: IEEE std 43 Insulation Resistance; IEEE std 286 Tip up test; IEC 60085 Thermal classification; IEC 60034-18-32 Voltage endurance; and NEMA MG-1 HV Pressure test. Large machines can be wound using this higher voltage, to result in lower current for the same output power, thereby reducing the stator copper losses ($I^2R$ losses). With these lower losses, the output rating of the machine could be increased to achieve a higher output rating. Secondly, the higher voltage can allow systems to start the machine directly from the 25 kV supply high voltage line, i.e., without the need for a stepdown transformer from 25 kV to a lower voltage for instance, 13.8 kV. This saves the space and cost of the transformer and reduces the system losses (by removing the losses that the transformer would have introduced).

What is claimed is:

1. An insulation system for an electric machine coil, the insulation system comprising a plurality of layers around the outside of an insulated conductor within at least one portion of the conductor, the plurality of layers comprising:
   a first corona shield tape;
   a stress grading tape situated around the outside of the first corona shield tape having an overlay length with the first corona shield tape;
   a second corona shield tape situated around the outside of the stress grading tape, the second corona shield tape having a first overlap length with the stress grading tape and a second greater overlap length with the first corona shield tape;
   an insulation tape situated around the outside of the second corona shield tape; and
   a sealing tape situated around the outstide of the insulation tape.

2. The insulation system of claim 1, wherein a portion of the insulation tape extends directly over the stress grading tape.

3. The insulation system of claim 2, wherein the insulation tape extends all the way to a knuckle of the coil.

4. The insulation system of claim 1, wherein the first overlap length is ½ inch to ¾ inch.

5. The insulation system of claim 1, wherein the second overlap length is at least 2 inches.

6. The insulation system of claim 1, wherein the insulation system has a 25 kV rating and the stress grading tape extends at least 6½ inches and not more than 20 inches.

7. The insulation system of claim 6, wherein the stress grading tape extends 6¾ inches.

8. The insulation system of claim 1, wherein the insulation system has a 7 kV rating and the stress grading tape extends at least 2.75 inches and not more than 4 inches.

9. The insulation system of claim 1, wherein the insulation system has a 8 kV rating and the stress grading tape extends at least 3 inches and not more than 6 inches.

10. The insulation system of claim 1, wherein the insulation system has a 10 kV rating and the stress grading tape extends at least 4 inches and not more than 9 inches.

11. The insulation system of claim 1, wherein the insulation system has a 14 kV rating and the stress grading tape extends at least 4.5 inches and not more than 12 inches.

12. The insulation system of claim 1, wherein the insulation system has a 15 kV rating and the stress grading tape extends at least 5 inches and not more than 16 inches.

13. The insulation system of claim 1, wherein the first corona shield tape extends in a core section of the coil and at least 3 inches past the end of the core section.

14. The insulation system of claim 1, wherein the first and second corona shield tapes are polyester fleece or glass fabric impregnated with electrically conductive varnish.

15. A method of manufacturing an insulation system for an electric machine coil, the method comprising:
   providing an insulated conductor;
   applying a first corona shield tape as a half-lap layer over at least a portion of the insulated conductor;
   applying a stress grading tape as a half-lap layer over at least a portion of the first corona shield tape;
   applying a second corona shield tape as a half-lap layer over at least a portion of the stress grading tape, the second corona shield tape having a first overlap length with the stress grading tape and a second greater overlap length with the first corona shield tape;
   applying an insulation tape over respective exposed portions of both the stress grading tape and the second corona shield tape; and
   applying a sealing tape over at least a portion of the insulation tape.

16. The method of claim 15, wherein the second corona shield tape is applied such that it is situated directly over the first corona shield tape over a distance.

17. The method of claim 15, wherein the second corona shield tape is applied such that it is situated directly over the first corona shield tape for at least 2 inches.

18. The method of claim 15, wherein:
   the first corona shield tape is applied from a core section of the coil to an overhang section of the coil;
   the stress grading tape is applied in the overhang section of the coil; and
   the second corona shield tape is applied in the overhang section of the coil.

19. The method of claim 15, wherein the first corona shield tape, the stress grading tape, the second corona shield tape, the insulation tape, and the sealing tape are applied on both a first side of a knuckle of the coil and a second side of the knuckle of the coil.

20. The method of claim 15, wherein the electric machine coil is provided in a rotating electric machine, the method further comprising:
 connecting the rotating electric machine having the electric machine coil directly to the a 25 kV supply high voltage line, without a step down transformer.

21. The insulation system of claim 6, wherein the electric machine coil is provided in a rotating electric machine connected directly to a 25 kV supply high voltage line, without a step down transformer.

* * * * *

UNITED STATES PATENT AND TRADEMARK OFFICE
CERTIFICATE OF CORRECTION

PATENT NO. : 11,804,748 B2
APPLICATION NO. : 17/748407
DATED : October 31, 2023
INVENTOR(S) : Jan de Swardt Page 1 of 1

It is certified that error appears in the above-identified patent and that said Letters Patent is hereby corrected as shown below:

In the Claims

Claim 1, Line 52: please replace "overlay" with --overlap--

Claim 1, Line 61: please replace "outstide" with --outside--

Signed and Sealed this
Eleventh Day of March, 2025

Coke Morgan Stewart
*Acting Director of the United States Patent and Trademark Office*